United States Patent
Brangenfeldt

[11] Patent Number: 6,126,562
[45] Date of Patent: Oct. 3, 2000

[54] TENSIONING DEVICE FOR DRIVE BELTS

[76] Inventor: Torbjörn Brangenfeldt, Hults gata 36, 436 44 Askim, Sweden

[21] Appl. No.: 09/039,139

[22] Filed: Mar. 13, 1998

[30]    Foreign Application Priority Data

Sep. 14, 1995 [SE]  Sweden ................................. 9503177
Sep. 13, 1996 [WO]  WIPO ...................... PCT/SE96/01141

[51] Int. Cl.$^7$ ...................................................... F16H 7/08
[52] U.S. Cl. ............................................. 474/109; 474/101
[58] Field of Search .................................... 474/112, 132, 474/110, 121, 74, 201, 187, 186, 101, 109, 174, 87, 5, 242

[56]          References Cited

U.S. PATENT DOCUMENTS 1,567,494  12/1925  Fahrney .
3,574,287  4/1971   Heidacker ................................. 474/136
4,989,398  2/1991   Kuhn et al. .......................... 424/199 X

FOREIGN PATENT DOCUMENTS 1111228      2/1956  France .
275166       1/1990  German Dem. Rep. .
WO 94/02756  2/1994  WIPO .

OTHER PUBLICATIONS

AE: Patent Abstracts of Japan, vol. 10, No. 130 (M–478), abstract of Japanese patent No. 60–256659, Inventor: Iwata; Issued: Dec. 18, 1985.

*Primary Examiner*—David A. Bucci
*Assistant Examiner*—Marcus Charles
*Attorney, Agent, or Firm*—Jeffrey Slusher

[57]          ABSTRACT

A tensioning device is provided for drive belts, which is formed as a resilient, bendable ring. The ring is arranged to be inserted between lengths of the drive belt and may be positioned in a groove in one of the pulleys of the belt transmission of which the drive belt is an integral part. The ring is designed with such a large circumference that, during expansion, it is squeezed between the lengths of the drive belt, which causes the drive belt to be tensioned.

5 Claims, 2 Drawing Sheets

TENSIONING DEVICE FOR DRIVE BELTS

CROSS-REFERENCE TO RELATED APPLICATIONS

This application is a continued of International Application No. PCT/SE96/01141, filed Sep. 13, 1996.

TECHNICAL FIELD

The invention relates to a tensioning device for drive belts, particularly cone belts.

TECHNICAL BACKGROUND

Drive belts, which convey forces from one pulley to another solely by means of frictional forces, require a certain tension which provides the necessary contact against the pulleys. It is previously known to start and maintain this tension either by means of adapting the distance between the pulleys or by means of a tensioning pulley, which presses against a length of the belt and deflects it in a larger or smaller arc in order to tension the belt. An adaption of the distance between the shafts requires that at least one shaft is movable, which in turn generally implies that the entire unit, of which the shaft is a part, has to be movable. Many times, such an arrangement is not possible because of the fact that such a displacement cannot be done or is not convenient. If an automatic post-tensioning of the belt is desired after mounting, something which in many cases is desirable, it is often most disadvantageous if an entire unit should have to be displaced by means of, for instance, springs or the force of gravity.

When the principle of correcting the distance between the shafts is concerned, the only remaining possibility, in many cases, is to apply a manual post-tensioning. For the remaining cases, the principle of a tensioning pulley must be applied. This, however, implies that an additional bearing has to be arranged and when automatic post-tensioning by means of a spring-loaded tensioning pulley is concerned, there is a risk that this and its suspension start to oscillate.

For this reason, there is a need of another type of tensioning device, which is not associated with the above-mentioned disadvantages. For chain drives it has been suggested to insert a shaft-less, resilient ring between the chain lengths. The ring may adopt a compressed shape between the chain lengths, when in a compressed position, in order to subsequently expand to a more circular shape whenever a post-tensioning is required. This solution, which is evident from DD, A3, 275 166, may not, however, be applied for belt drives. When chain drives are concerned, the tensioning pulley is toothed and engages with the chain and will therefore maintain its position in the system. When belt drives are concerned, on the other hand, slippage is to be expected, resulting in that the ring may "float" within the system.

SUMMARY OF THE INVENTION:

In the present invention, a principle associated with the principle of a tensioning ring is utilized whereby, however, it is adapted to belt drives and preferably cone belt drives by means of the unique features of the invention.

These imply that the tensioning ring is inserted between the lengths of the drive belt and arranged so that it maintains its position in the driving system.

In one embodiment, the tensioning ring is fixed by means of travelling together with the belt around a pulley which the drive belt engages with, and in such a way that this engagement does not deteriorate, but the power transmission properties remain.

In another embodiment, the drive belt and the tensioning ring are furnished with teeth, which provide a positive retention of the tensioning ring in its position.

By means of these arrangements, a tensioning device is provided which does not possess the previously mentioned disadvantages but which may be applied for fixed distances between shafts and which provides an automatic post-tensioning of the belt in case it increases in length due to strain or wear. Furthermore, the tensioning device according to the invention provides good damping of fluctuations in the speed of rotation.

DESCRIPTION OF THE DRAWINGS

Three different embodiments of the invention are described in the following, whereby reference is made to the attached drawings, in which.

PREFERRED EMBODIMENTS

Figure 1:
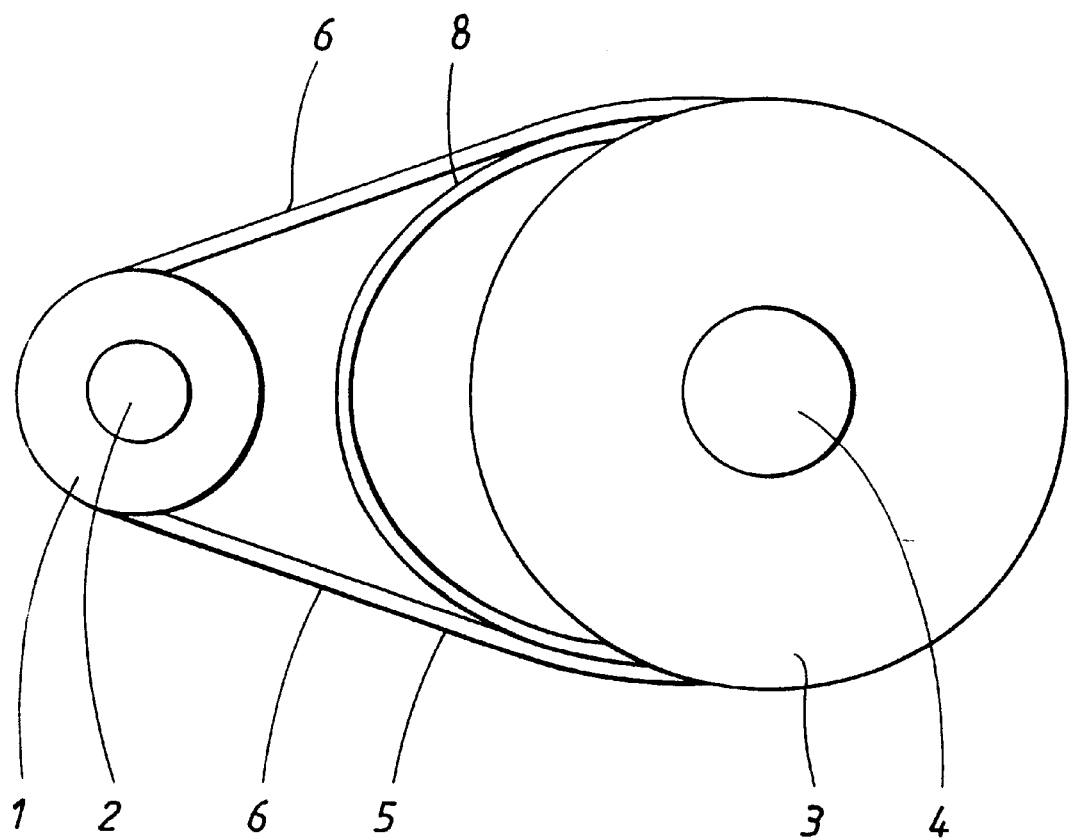
FIG. 1 shows a side view of a belt drive, schematically illustrating the principle of the first two embodiments.

In FIG. 1 a belt drive is shown in side view. It is designed with a first pulley 1 which is able to rotate about a shaft 2, and with a second pulley 3 which may rotate about a shaft 4. The pulleys are connected by an endless drive belt 5. The drive belt is presumed to be a cone belt, i.e. a wedge-shaped belt, which is situated in a groove in the pulley. This is evident from FIG. 2, wherein the pulley (1 or 3) and the belt 5 have the same designations as in FIG. 1.

Free lengths 6 of the belt are exposed between the engagement of the belt 5 at the respective pulleys. In order to maintain power transmission by means of the frictional engagement of the belt with the pulleys, these lengths must be kept under a certain tension, thus an adapted belt tension must be maintained. Due to elongation and wear of the belt, this tension will decrease over a certain operating interval and a post-tensioning must be performed, also if, when mounting the belt, an adapted tension has been reached by means of a belt length which is correctly adapted to the prevailing geometric conditions. Even this, however, is difficult to achieve in certain installations. In order to obtain such a correct, initial belt tension, it is necessary in practice that one of the shafts is displaceable which, as previously mentioned, is not always possible.

In order to reach a correct belt tension during the lifetime of the belt and also in order to, when initially mounting the belt the first time, arrive at the correct belt tension, an automatically acting belt tensioning device is required. If not, perpetual manual adjustments would otherwise have to be performed. Such a device according to the invention is constituted of a resiliently bendable ring 8, situated between the lengths 6.

The ring 8 travels around the pulley 3. It is dimensioned in such a way that it is compressed by the belt lengths 6 to an approximately elliptical shape. Thereby, the belt lengths 6 are influenced by a spring force from the ring 8 of the tensioning device and the belt lengths are maintained under tension.

In order to be able to utilise the herein described principle of the belt tensioning device, it is required that it does not negatively affect the frictional transmission from belt to pulley to any considerable extent. This is achieved, according to the first embodiment illustrated in FIG. 2, by means of the tensioning ring 8 being inserted into a groove 9, which constitutes a continuation inwards towards the centre of the bottom part of the wedge-shaped groove 10, into which the cone belt 5 is inserted. Consequently, the belt, in comparison to a common cone belt installation, has a completely unchanged grip and the ring 8 only affects the lengths 6 of the belt so that these are kept tensioned.

Figure 2:
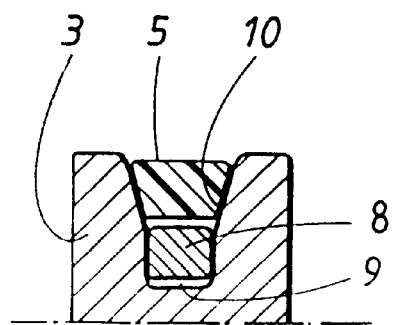
FIG. 2 shows a section, as seen along a diameter of pulley for cone belt driving, illustrating the first embodiment.
Figure 3:
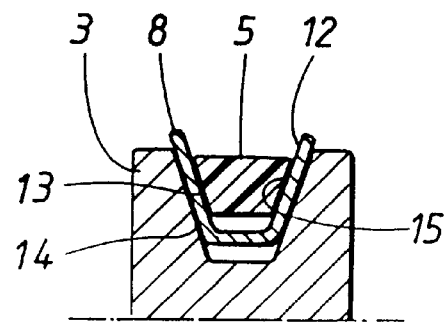
FIG. 3 shows a corresponding section of the second embodiment.

The second embodiment is shown in FIG. 3. Also here, the pulley 3 and the cone belt 5 are to be found. Herein, however, the edge-shaped grooves 12 of the pulley are wider than what a normal contact of the belt 5 would require. The groove is namely adapted to the outside of the tensioning ring, also herein denoted with 8. The tensioning ring has a V-shape with a wall 13, the outside of which, denoted with 14, is adapted to make contact against the outsides of the belt 5. Consequently, this implies that the inside of the tensioning ring 8 forms a groove corresponding to the groove 10, according to FIG. 2 (when the same belt profile is concerned), when the tensioning ring is inserted into its groove 12.

In the second embodiment, it is certainly the case that the contact of the cone belt against the pulley is different, since the contact is made via the tensioning ring 8, which constitutes a spacer. However, this does not have to imply any disadvantage so long as the material of the tensioning ring is correctly adapted so that it exhibits high friction against both the cone belt and the groove of the pulley. It may even be possible to improve the friction if a material with a higher coefficient of friction is chosen.

In both embodiments, operation implies that the tensioning ring 8 will be subjected to a perpetual shape modification, resulting in a bending of the same. The material of the ring has to be adapted to this. However, a number of elastomers, plastic and rubber materials may be selected, which can withstand a long operation time without snapping or obtaining any abnormal heating. One material which successfully has been tested in this connection is polypropylene.

Herein, the invention has been shown as being applied to cone belts. The first embodiment, however, may also be applied to other belt types, for instance so called V-belts with a number of parallel V-shaped portions whereby, while maintaining the principle according to FIG. 2, one or several tensioning rings are inserted into countersunk grooves in the pulley which is provided with several V-grooves. Also the second embodiment may be applied in this case, accordingly the tensioning is designed as a spacing, arranged with repeated V-shapes, between the V-belt and the grooves of the pulley.

Especially the embodiment according to FIG. 2 could, moreover, be utilized for tooth belts, whereby a groove is notched under the tooth bottoms of the pulley in which groove the tensioning ring is inserted and rests against the tooth tops of the belt. When the embodiment according to FIG. 3 is concerned, it may be complemented with teeth on the inside 15 of the tensioning ring 8 and/or outside 14 for meshing with the corresponding teeth shapes on the sides of the cone belt 5 and in the grooves of the pulley 12, respectively. If the tensioning ring 8 has teeth on both the inside and the outside for tooth engagement, with both the drive belt 5 and the groove of the pulley 12, and the drive belt also has tooth engagement with the second pulley 1, a positive power transmission of tooth belt type with no slippage is obtained.

Figure 4:
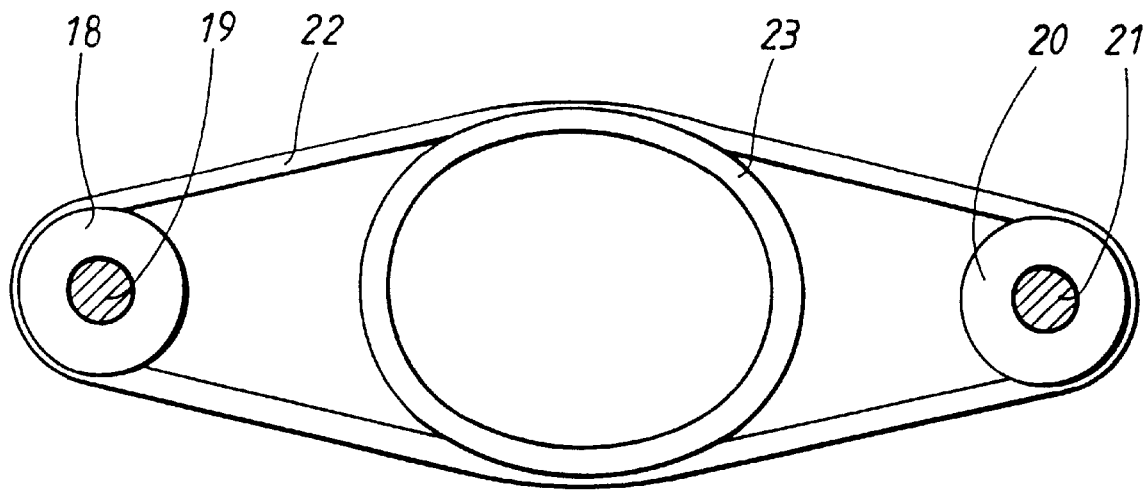
FIG. 4 shows a side view, illustrating the principle of the third embodiment.

The principle of the second embodiment of the invention is evident from FIG. 4. The drive belt, herein 22, encloses and extends between two pulleys 18 on a shaft 19, and 20 on a shaft 21. The tensioning ring, herein 23, is, as previously described, resiliently compressible and has a circular shape in its non-clamped state. In FIG. 4, it is shown inserted between the lengths of the belt 22 without enveloping any of the pulleys. Consequently, it is in a free position between the pulleys and is kept in place by the lengths of the drive belt 22.

It is necessary that the tensioning ring maintains a position between the pulleys and is not in contact with these, since the rotation of the tensioning ring, by means of driving from the contacting belt lengths, will be opposite to the rotation of the adjacent periphery of the respective pulleys. A contact between the tensioning ring and the pulley would, consequently, result in a movement in the opposite direction, with wear and heating as a result. Since slippage may occur between the tensioning ring and the lengths of the drive belt, it cannot be counted upon, when solely frictional driving is concerned, that the tensioning ring maintains its free position between the pulleys. When uneven slippage towards the two lengths occur, the ring will be displaced in direction towards one of the pulleys.

The problem with maintaining the positions of the tensioning ring between the pulleys is, according to the invention, solved by means of the drive belt 22 being provided with teeth on its side facing inwards, and by means of the tensioning ring likewise being provided with teeth on its outer periphery.

Figures 5, 6:
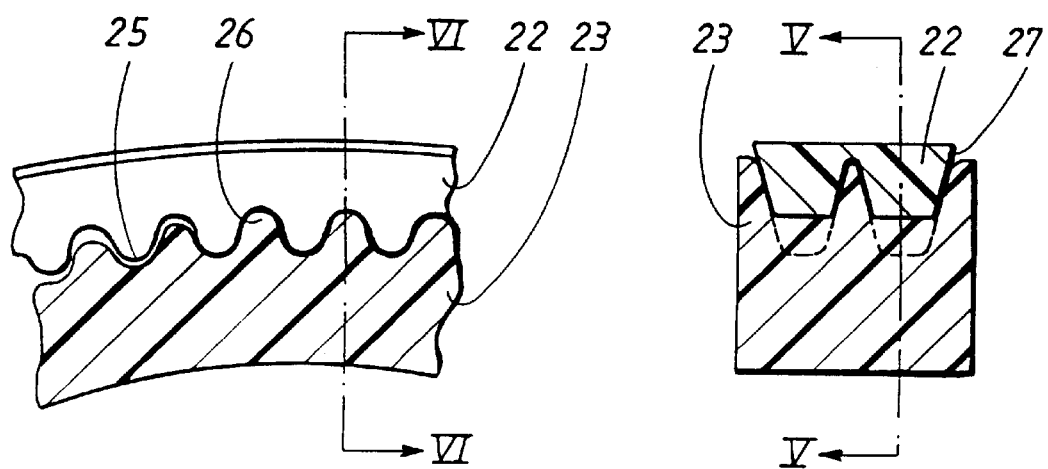
FIG. 5 shows a section along the line V—V in FIG. 6, passing longitudinally through a portion of the drive ring and the tensioning ring.
FIG. 6 shows a transverse section along the line VI—VI in FIG. 5.

This is evident from FIG. 5, which is a section through the tensioning ring 23 in an axial plane, and also a side view of the drive belt 22. In FIG. 5, he teeth on the inside of the drive belt are denoted with 25, and the teeth on the outer periphery of the tensioning ring 23 are denoted with 26.

A cross-section through the tensioning ring and the drive belt is shown in FIG. 6. Thereby, it is evident that the drive belt has two parallel V-profiles, which inwards are terminated by the teeth 25, and outwards the V-profiles are terminated by a cantilevered edge 27 on both sides. The tensioning ring 23 has two V-grooves which, in their bottoms, are provided with said teeth 26. The dimensions are adapted in such a way that the V-profiles of the drive belt fit into the V-groove of the tensioning ring.

The described design of the drive belt and the tensioning ring may be varied. The number of V-profiles may be limited to one or may be more than two. Several parallel drive belts may be tightened by one tensioning ring and alternatively the tensioning ring may be divided into several units for supporting several V-profiles of the drive belt. For the invention, it is however essential that the drive belt has teeth on its portion facing inwards, and that the tensioning ring has corresponding teeth on its outer periphery meshing with the teeth of the drive belt.

When operating the belt drive shown in FIG. 4, the tensioning ring will, by means of the positive tooth drive, be driven with the same peripheral speed by both drive belt lengths, since no slippage may occur. Thereby, the tensioning ring maintains the position in which it has been inserted between the belt lengths, and this is independent of whether the drive belt slips at the pulleys. Since the tensioning ring is dimensioned in such a way that it is compressed by the belt lengths, it will keep these tensioned and the desired effect has been obtained.

This embodiment of the invention has the advantage that the tensioning ring may be inserted between the lengths of the drive belt without any dismantling; the tensioning ring only has to be compressed so that it finds space between the lengths. If, for some reason, the tensioning ring has to be exchanged, this may take place without any further dismantling of the belt gear. Another advantage is that no modifications to the pulleys have to be done. Thus, an already existing belt drive may be provided with the described tensioning ring and thereby an advantageous belt tensioning system is obtained by means of a very simple mounting operation.

I claim:

1. An arrangement for tensioning and damping vibrations in a drive belt comprising:
   a first and a second pulley; and
   a resilient ring member that extends around the first pulley;
   in which:
      the drive belt extends around both pulleys for transmitting driving force between the pulleys, with intermediate belt portions of the drive belt extending between the pulleys on either side;
      a circumferential groove is provided in at least the first pulley;
      a first length of the ring member seats in the groove, thereby engaging the first pulley;
      a second length of the ring member extends outward from the first pulley toward the second pulley between and contacting the intermediate belt portions of the drive belt, the ring member being compressed by the drive belt and thereby resiliently biassing the intermediate belt portions away from each other and thereby tensioning and damping vibration in the drive belt;
      the groove has radially outward-extending teeth; and
      the ring member has radially inward-extending teeth that mesh with and engage the outward-extending teeth of the groove.

2. An arrangement for tensioning and damping vibrations in a drive belt comprising:
   a first and a second pulley; and
   a resilient ring member that extends around the first pulley;
   in which:
      the drive belt extends around both pulleys for transmitting driving force between the pulleys, with intermediate belt portions of the drive belt extending between the pulleys on either side;
      a circumferential groove is provided in at least the first pulley;
      a first length of the ring member seats in the groove, thereby engaging the first pulley;
      a second length of the ring member extends outward from the first pulley toward the second pulley between and contacting the intermediate belt portions of the drive belt, the ring member being compressed by the drive belt and thereby resiliently biassing the intermediate belt portions away from each other and thereby tensioning and damping vibration in the drive belt;
      the groove has radially outward-extending teeth;
      the ring member has inward-extending teeth that mesh with and engage the outward-extending teeth of the groove;
      the drive belt has radially inward-extending teeth; and
      the ring member has radially outward-extending teeth that mesh with and engage the inward-extending teeth of the drive belt.

3. An arrangement for tensioning and damping vibrations in a drive belt comprising:
   a first and a second pulley; and
   a resilient ring member that extends around the first pulley;
   in which:
      the drive belt extends around both pulleys for transmitting driving force between the pulleys, with intermediate belt portions of the drive belt extending between the pulleys on either side;
      a circumferential groove is provided in at least the first pulley;
      a first length of the ring member seats in the groove, thereby engaging the first pulley;
      a second length of the ring member extends outward from the first pulley toward the second pulley between and contacting the intermediate belt portions of the drive belt, the ring member being compressed by the drive belt and thereby resiliently biasing the intermediate belt portions away from each other and thereby tensioning and damping vibration in the drive belt;
      the drive belt seats in the groove and thereby engages the first pulley;
      the first length of the ring member seats in the groove radially inward of the drive belt;
      the ring member, in transverse cross section, is substantially V-shaped; and
      the drive belt has a substantially V-shaped transverse cross section and, along its length of engagement with the pulley, seats in the V-shaped ring member, thereby engaging the pulley via compressive and frictional engagement with the ring member.

4. An arrangement for tensioning and damping vibrations in a drive belt comprising:
   a first and a second pulley; and
   a resilient ring member that extends around the first pulley;
   in which:
      the drive belt extends around both pulleys for transmitting driving force between the pulleys, with intermediate belt portions of the drive belt extending between the pulleys on either side;
      a circumferential groove is provided in at least the first pulley;
      a first length of the ring member seats in the groove, thereby engaging the first pulley;
      a second length of the ring member extends outward from the first pulley toward the second pulley between and contacting the intermediate belt portions of the drive belt, the ring member being compressed by the drive belt and thereby resiliently biasing the intermediate belt portions away from each other and thereby tensioning and damping vibration in the drive belt;
      the drive belt seats in the groove and thereby engages the first pulley; and
      the first length of the ring member seats in the groove radially inward of the drive belt;

the drive belt is a cone belt, with a truncated, substantially V-shaped transverse cross section;

the groove has a substantially V-shaped transverse cross-sectional portion corresponding in shape to the cross section of the drive belt;

the V-shaped portion of the groove constitutes an outer groove portion;

side walls of the drive belt contact and engage the V-shaped portion of the groove;

the groove has a rectangular inner groove portion located radially inward of the outer groove portion; and the ring member seats in the rectangular inner groove portion, radially inward from the drive belt.

5. An arrangement for tensioning and damping vibrations in a drive belt comprising:

a first and a second pulley; and a resilient ring member that extends around the first pulley;

in which:

the drive belt extends around both pulleys for transmitting driving force between the pulleys, with intermediate belt portions of the drive belt extending between the pulleys on either side;

a circumferential groove is provided in at least the first pulley;

a first length of the ring member seats in the groove, thereby engaging the first pulley;

a second length of the ring member extends outward from the first pulley toward the second pulley between and contacting the intermediate belt portions of the drive belt, the ring member being compressed by the drive belt and thereby resiliently biassing the intermediate belt portions away from each other and thereby tensioning and damping vibration in the drive belt;

the drive belt seats in the groove and thereby engages the first pulley; and the first length of the ring member seats in the groove radially inward of the drive belt;

the ring member, in transverse cross section, is substantially V-shaped; and the drive belt, along its length of engagement with the pulley, seats within the V-shaped ring member, thereby engaging the pulley via compressive and frictional engagement with the ring member.

* * * * *